D. A. Ter Hoeven.

Treating Offal.

No. 4,052. Reissued Jun. 28, 1870.

Witnesses;
Edw. Brown
W. Leicester Austin

Inventor;
D. A. Ter Hoeven

United States Patent Office.

DIRK ADREAAN TER HOEVEN, OF PHILADELPHIA, PENNSYLVANIA.

*Letters Patent No.* 79,160, *dated June* 23, 1868; *reissue No.* 4,052, *dated June* 28, 1870.

DIVISION A.

IMPROVEMENT IN FERTILIZERS.

The Schedule referred to in these Letters Patent and making part of the same.

I, DIRK ADREAAN TER HOEVEN, of Philadelphia, Pennsylvania, have invented a new Fertilizing Substance, of which the following is a specification.

*Nature and Object of the Invention.*

My invention consists of a fertilizing substance, composed of horns, hoofs, and other animal matter of equivalent character, prepared by subjecting them to three operations, described hereafter.

*General Description.*

I will proceed to describe, in the first instance, the mode or process of treating horns, hoofs, &c., reference being had to the accompanying drawing, in which—

Figure 1:
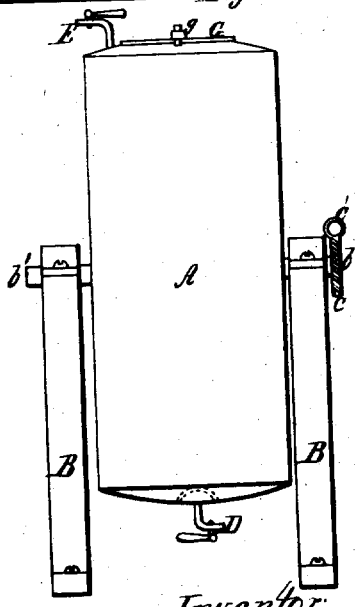

Figure 1 represents a digester.

Figure 2:
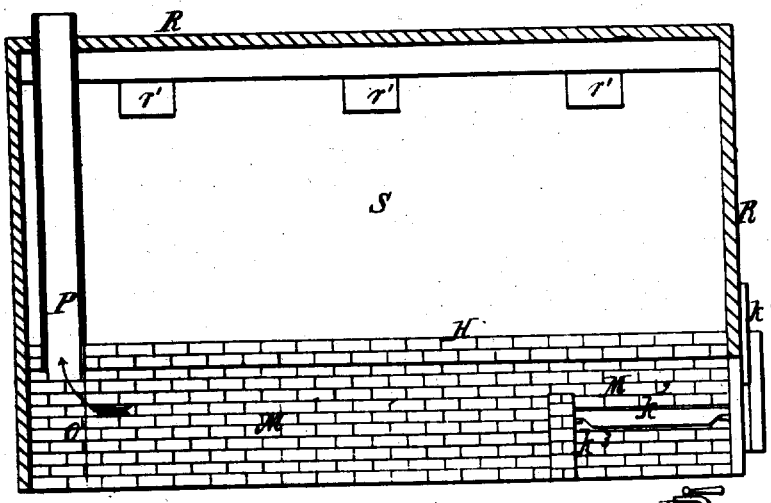

Figure 2 a vertical section of a drying-oven; and

Figure 3:
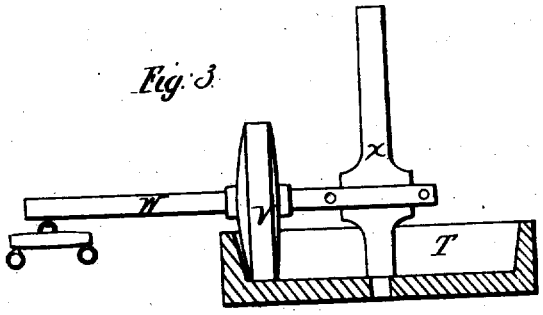

Figure 3 a vertical section of a grinding-mill.

It should be understood in the outset that, although I have selected these objects or devices to illustrate my mode or process of treating horns, hoofs, &c., I lay no claim to any of the devices shown, inasmuch as the process may be carried into effect through the medium of different agencies, nor do I claim, in this division, any specific process, that being the subject of a claim in another division of this application for a reissue.

The digester A, fig. 1, has trunnions adapted to bearings, *b*, on the frame B B, and one of the trunnions is provided with a worm-wheel, *c*, into which gears a worm, *c'*, so that, by operating the latter, the digester can be dumped and emptied of its contents.

The other trunnion is hollow, for the admission of steam into the digester, and there is a cock, D, by which the condensed steam may be drawn off, and at the opposite end is a cock, E, for the discharge of air or for the escape of steam, at the conclusion of the operation. The digester is provided at one end with a suitable man-hole, having a detachable cover, G.

It will be seen that this digester differs but little from apparatus in common use for digesting various substances.

Horns, hoofs, button-waste, horn-turnings, whalebone-shavings, or other animal substances of a like character, are introduced into this or other suitable digester, and subjected to the action of steam, under a pressure of from forty to eighty pounds per square inch for about one and a quarter to one and a half hours, if the contents of the digester consist of horns or button-waste, but, if the contents consist of hoofs, they should be digested for about two hours, or two hours and a half.

By this, the first operation or stage of the process, is dissolved the gelatinous matter contained in the horns, hoofs, &c., which are now in a condition to be subjected to the second stage of the process, that of kiln-drying, which may be accomplished in many ways.

The drying-kiln, fig. 2, which is selected to illustrate this part of the process, consists of a brick floor, H, beneath which, at one end of the kiln, are a number of fire-places, $k^1$ being one of the fire-doors, $k^2$ the fire-bars, and $k^3$ being the end wall.

The fire-places are separated from each other by walls extending the entire length of the kiln, and communicate with a chimney, P.

A roofed structure R, of wood or other suitable material, is erected above the floor of the kiln, and in this structure are ventilators, *r'*, for regulating the temperature of the kiln.

The horns, hoofs, &c., are removed from the digester to the floor of the kiln, over which they may be spread to a depth of about six inches. This floor is maintained at the comparatively low temperature of about one hundred and seventy degrees, and the room S, above, at a temperature of from ninety to one hundred degrees. The horns, hoofs, &c., will be in a proper condition for being removed from the oven in two or three days.

Horns, hoofs, and other animal substances, have been, heretofore, used incidentally with bones, &c., as manure, but they have been employed either in a non-decomposed state, in which case their action on the soil has been slow or imperfect, or they have been decomposed by the costly application of acids.

By first subjecting the horns, hoofs, &c., to the action of steam under pressure, and then drying them at a low temperature, two important results are attained. First, the fertilizing properties of the product are preserved to an extent which cannot be accomplished by the acid processes, or by simply digesting the substances without subsequent drying at a low temperature; secondly, the horns, hoofs, &c., are reduced to such a friable condition that the third and last operation of crushing or grinding is rendered easy.

For effecting the last stage of the process I prefer to use a mill, of the character shown in fig. 3, in which—

T represents a trough for receiving the prepared horns, hoofs, &c.

V is a stone, arranged to turn on the shaft W, which is connected to the vertical shaft K, the shaft W being driven by horse or steam-power, so that the wheel V will roll around the trough, over and in contact with the prepared hoofs, &c., and will triturate the same. The ground material, which, if desired, may be sifted, is then ready for use as a fertilizer, either alone or in combination with other fertilizers.

Irrespective of the mediums through which the process is carried out,

I claim, as a new article of manufacture—

A fertilizer, composed of horns, hoofs, or other animal matter of an equivalent character, prepared in the manner herein described.

In testimony whereof I have signed my name to this specification in the presence of two subscribing witnesses.

DIRK ADREAAN TER HOEVEN.

Witnesses:

WM. A. STEEL,

LOUIS BOSWELL.